(12) United States Patent
Jansen et al.

(10) Patent No.: US 7,999,037 B2
(45) Date of Patent: *Aug. 16, 2011

(54) POLYCARBONATE COMPOSITIONS

(75) Inventors: Bernardus Johannes Paulus Jansen, Bergen op Zoom (NL); Yohana Perez de Diego, Murcia (ES); Andries Adriaan Volkers, Wouw (NL)

(73) Assignee: Sabic Innovative Plastics IP B.V., Bergen op Zoom (NL)

( * ) Notice: Subject to any disclaimer, the term of this patent is extended or adjusted under 35 U.S.C. 154(b) by 0 days.

This patent is subject to a terminal disclaimer.

(21) Appl. No.: 12/347,227

(22) Filed: Dec. 31, 2008

(65) Prior Publication Data

US 2010/0168311 A1 Jul. 1, 2010

(51) Int. Cl.
*C08G 59/32* (2006.01)
*C08G 63/91* (2006.01)
*C08G 69/48* (2006.01)
*C08G 73/00* (2006.01)
*C08F 8/00* (2006.01)
*C08F 283/00* (2006.01)
*C08L 71/12* (2006.01)
*C08L 67/00* (2006.01)
*C08L 77/00* (2006.01)
*C08J 3/22* (2006.01)
*C08K 3/34* (2006.01)

(52) U.S. Cl. ........ 525/186; 525/132; 525/149; 524/451; 528/170

(58) Field of Classification Search ................... 524/451; 525/66, 67, 71, 186, 132, 419; 528/170
See application file for complete search history.

(56) References Cited

U.S. PATENT DOCUMENTS

| | | | | |
|---|---|---|---|---|
| 4,472,554 A | * | 9/1984 | Grigo et al. | 525/67 |
| 5,565,515 A | * | 10/1996 | Ishiwa et al. | 524/504 |
| 6,133,360 A | * | 10/2000 | Barren et al. | 524/431 |
| 7,348,394 B2 | * | 3/2008 | Shyamroy et al. | 528/196 |
| 2001/0009946 A1 | * | 7/2001 | Catsman et al. | 525/67 |
| 2005/0222334 A1 | * | 10/2005 | Srinivasan et al. | 525/178 |
| 2005/0228137 A1 | * | 10/2005 | Srinivasan et al. | 525/186 |
| 2007/0100118 A1 | * | 5/2007 | Chatterjee et al. | 528/196 |
| 2008/0029744 A1 | * | 2/2008 | Jansen et al. | 252/601 |
| 2008/0033108 A1 | * | 2/2008 | Kung et al. | 525/67 |

FOREIGN PATENT DOCUMENTS

| | | | |
|---|---|---|---|
| WO | WO 00/24829 | * | 5/2000 |
| WO | 2007050376 | | 3/2007 |

* cited by examiner

*Primary Examiner* — Katarzyna Wyrozebski Lee
*Assistant Examiner* — Anthony H Sheh
(74) *Attorney, Agent, or Firm* — Fay Sharpe LLP; Richard M. Klein

(57) ABSTRACT

Polycarbonate compositions are disclosed. The compositions comprise a polycarbonate polymer (A) having repeating units derived from at least three different monomers, one monomer being 2-phenyl-3,3-bis(4-hydroxyphenyl)phthalimidine (PPPBP); and the other two monomers having the formula:

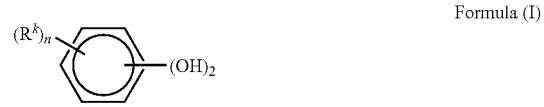

Formula (I)

wherein each $R^k$ is independently a halogen atom, a $C_{1-10}$ hydrocarbon group, or a $C_{1-10}$ halogen substituted hydrocarbon group, and n is 0 to 4; and an impact modifier (B). The resulting composition has improved heat resistance and chemical resistance, particularly to Fuel C.

14 Claims, No Drawings

POLYCARBONATE COMPOSITIONS

BACKGROUND

The present disclosure relates to thermoplastic polycarbonate compositions having improved heat resistance. In particular, the disclosure relates to such polycarbonate compositions having improved heat resistance, impact performance, and flow properties. Also included are methods for preparing and/or using the compositions, such as forming articles therefrom.

Polycarbonates (PC) are synthetic thermoplastic resins derived from bisphenols and phosgenes, or their derivatives. They are linear polyesters of carbonic acid and can be formed from dihydroxy compounds and carbonate diesters, or by ester interchange. Polymerization may be in aqueous, interfacial, or in nonaqueous solution. Polycarbonates are a useful class of polymers having many desired properties. They are highly regarded for optical clarity and enhanced impact resistance and ductility at room temperature or below.

Impact modifiers are incorporated into polymeric resins to improve the impact strength of finished articles made from such resins. Exemplary impact modifiers include acrylonitrile-butadiene-styrene (ABS) and methacrylate-butadiene-styrene (MBS) polymers. ABS and MBS polymers are synthetic thermoplastic resins made by polymerizing acrylonitrile or methacrylate, respectively, with styrene in the presence of polybutadiene. The properties of ABS; and MBS can be modified by varying the relative proportions of the basic components, the degree of grafting, the molecular weight, etc. Overall, ABS and MBS are generally strong, and lightweight thermoplastics.

Blends of polycarbonates with ABS or MBS, or PC/ABS or PC/MBS blends, are also well-known. For example, SABIC Innovative Plastics provides such blends commercially under the brand name CYCOLOY®. These amorphous thermoplastic blends have many desired properties and/or characteristics, including high impact strength, heat resistance, good processability, weather and ozone resistance, good ductility, electrical resistance, aesthetic characteristics, etc. They are widely used in the automotive market, for producing appliance and electrical components, medical devices, and office and business equipment such as computer housings, etc.

There remains a need in the art for thermoplastic polycarbonate compositions having improved heat resistance and chemical resistance. Desirable features of such materials include, among others, excellent mechanical properties, ease of manufacture, and transparency.

BRIEF DESCRIPTION

Disclosed, in various embodiments, are polycarbonate compositions that have an improved combination of properties. These blends have improved heat resistance and suitably maintain their mechanical and/or processing properties as well. Methods for preparing and/pr using the same, such as for forming shaped articles, are also disclosed.

In one embodiment, a thermoplastic composition comprises:
 a polycarbonate polymer (A) having repeating units derived from at least three different monomers (I), (II), and (III), wherein
  monomer (I) is 2-phenyl-3,3-bis(4-hydroxyphenyl)phthalimidine (PPPBP); and
  monomers (II) and (III) are each a dihydroxy compound of formula (I):

Formula (I)

wherein each $R^k$ is independently a halogen atom, a $C_{1-10}$ hydrocarbon group, or a $C_{1-10}$ halogen substituted hydrocarbon group, and n is 0 to 4, monomer (II) being different from monomer (III); and an impact modifier (B).

In certain embodiments, monomer (II) is methylhydroquinone and monomer (III) is hydroquinone. In other embodiments, the mole ratio of monomer (I) to the sum of monomers (II) and (III) is from about 20:80 to about 40:60. The polycarbonate polymer (A) may be a terpolymer. In some specific embodiments, monomer (II) is methylhydroquinone; and the polycarbonate polymer comprises at least 17 mole percent of monomer (I) and at least 25 mole percent of monomer (II)

The impact modifier (B) may be selected from the group consisting of acrylonitrile-butadiene-styrene (ABS) and methacrylonitrile-butadiene-styrene (MBS) resins, and mixtures thereof.

The polycarbonate polymer (A) may comprise from about 60 to about 80 weight percent of the composition. The impact modifier (B) may comprise from about 2 to about 40 weight percent of the composition.

The thermoplastic composition may further comprise a talc filler (C). The talc filler (C) may comprise from about 5 to about 20 weight percent of the composition. In some specific embodiments where the thermoplastic composition does not include a talc filler, the composition may have a melt volume rate (MVR) of from about 4 to about 10 cc/10 min, when measured according to ISO 1133 at 260° C., 5 kg;

The thermoplastic composition may further comprise a styrene-acrylonitrile polymer (D) (i.e. free SAN) in an amount of from about 5 to about 10 weight percent of the thermoplastic composition.

The thermoplastic composition may have a percent retention of tensile elongation of at least 50 percent upon exposure to Fuel C, 0.5% strain, for 2 days according to ISO 4599; a melt volume rate (MVR) of 15 cc/10 min or less, when measured according to ISO 1133 at 260° C., 5 kg; a glass transition temperature of from about 160° C. to about 195° C.; a heat deflection temperature of at least 130° C., when measured according to ASTM D648; and/or a Vicat B50 softening temperature of at least 150° C., when measured according to ISO 306.

In some embodiments, the polycarbonate further includes a fourth monomer (IV) which is bisphenol-A.

In other embodiments, a thermoplastic composition comprises:
 a polycarbonate polymer (A) having repeating units derived from at least three different monomers (I), (II), and (III), wherein
  monomer (I) is 2-phenyl-3,3-bis(4-hydroxyphenyl)phthalimidine (PPPBP); and monomers (II) and (III) are each a dihydroxy compound of formula (I):

Formula (I)

wherein each $R^k$ is independently a halogen atom, a $C_{1-10}$ hydrocarbon group, or a $C_{1-10}$ halogen substituted hydrocarbon group, and n is 0 to 4, monomer (II) being different from monomer (III); and an impact modifier (B) selected from the group consisting of acrylonitrile-butadiene-styrene (ABS) and methacrylonitrile-butadiene-styrene (MBS) resins, and mixtures thereof; wherein the thermoplastic composition has a percent retention of tensile elongation of at least 50 percent upon exposure to Fuel C, 0.5% strain, for 2 days according to ISO 4599.

In still other embodiments, a thermoplastic composition comprises:
a polycarbonate polymer (A) having repeating units derived from at least three different monomers, the three monomers being 2-phenyl-3,3-bis(4-hydroxyphenyl) phthalimidine (PPPBP), hydroquinone and methylhydroquinone; and
an impact modifier (B); wherein the thermoplastic composition has a heat deflection temperature of at least 130° C., when measured according to ISO 75.

Also disclosed are polycarbonate polymers having repeating units derived from at least three different monomers (I), (II), and (III), wherein:
monomer (I) is 2-phenyl-3,3-bis(4-hydroxyphenyl)phthalimidine (PPPBP); and
monomers (II) and (III) are each a dihydroxy compound of formula (I):

Formula (I)

wherein each $R^k$ is independently a halogen atom, a $C_{1-10}$ hydrocarbon group, or a $C_{1-10}$ halogen substituted hydrocarbon group, and n is 0 to 4, monomer (II) being different from monomer (III).

In particular embodiments, monomers (II) and (III) comprise at least 60 mole percent, or at least 80 mole percent, of the polycarbonate polymer. The ratio of monomer (II) to monomer (III) may also be from about 3:4 to about 4:3. The polycarbonate polymer may have a percent retention of tensile elongation of at least 80 percent upon exposure to Fuel C, 0.5% strain, for 2 days according to ISO 4599.

In still other embodiments are disclosed polycarbonate polymer having repeating units derived from at least three different monomers (I), (II), and (III), wherein monomer (I) is 2-phenyl-3,3-bis(4-hydroxyphenyl)phthalimidine (PPPBP); monomer (II) is methylhydroquinone; monomer (III) is hydroquinone; monomer (I) comprises at least 17 mole percent of the polycarbonate polymer; monomer (II) comprises at least 25 mole percent of the polycarbonate polymer; and monomer (II) and monomer (III) together comprise at least 60 mole percent of the polycarbonate polymer.

Articles formed from the thermoplastic compositions described herein are also disclosed.

These and other non-limiting features or characteristics of the present disclosure will be further described below.

DETAILED DESCRIPTION

Numerical values in the specification and claims of this application, particularly as they relate to polymers or polymer compositions, reflect average values for a composition that may contain individual polymers of different characteristics. Furthermore, unless indicated to the contrary, the numerical values should be understood to include numerical values which are the same when reduced to the same number of significant figures and numerical values which differ from the stated value by less than the experimental error of conventional measurement technique of the type described in the present application to determine the value.

The present disclosure may be understood more readily by reference to the following detailed description of desired embodiments and the examples included therein. In the following specification and the claims which follow, reference will be made to a number of terms which shall be defined to have the following meanings.

The singular forms "a," "an," and "the" include plural referents unless the context clearly dictates otherwise. All ranges disclosed herein are inclusive of the recited endpoint and independently combinable (for example, the range of "from 2 grams to 10 grams" is inclusive of the endpoints, 2 grams and 10 grams, and all the intermediate values).

The modifier "about" used in connection with a quantity is inclusive of the stated value and has the meaning dictated by the context (for example, it includes at least the degree of error associated with the measurement of the particular quantity). The modifier "about" should also be considered as disclosing the range defined by the absolute values of the two endpoints. For example, the expression "from about 2 to about 4" also discloses the range "from 2 to 4."

The term "integer" means a whole number and includes zero. For example, the expression "n is an integer from 0 to 4" means n may be any whole number from 0 to 4, including 0.

Compounds are described using standard nomenclature. For example, any position not substituted by any indicated group is understood to have its valency filled by a bond as indicated, or a hydrogen atom. A dash ("—") that is not between two letters or symbols is used to indicate a point of attachment for a substituent. For example, the aldehyde group —CHO is attached through the carbon of the carbonyl group.

The term "aliphatic" refers to a linear or branched array of atoms that is not cyclic and has a valence of at least one. Aliphatic groups are defined to comprise at least one carbon atom. The array of atoms may include heteroatoms such as nitrogen, sulfur, silicon, selenium and oxygen or may be composed exclusively of carbon and hydrogen ("Alkyl"). Aliphatic groups may be substituted or unsubstituted. Exemplary aliphatic groups include, but are not limited to, methyl, ethyl, isopropyl, isobutyl, chloromethyl, hydroxymethyl (—CH$_2$OH), mercaptomethyl (—CH$_2$SH), methoxy, methoxycarbonyl (CH$_3$OCO—), nitromethyl (—CH$_2$NO$_2$), and thiocarbonyl.

The term "alkyl" refers to a linear or branched array of atoms that is composed exclusively of carbon and hydrogen. The array of atoms may include single bonds, double bonds, or triple bonds (typically referred to as alkane, alkene, or alkyne). Alkyl groups may be substituted or unsubstituted. Exemplary alkyl groups include, but are not limited to, methyl, ethyl, and isopropyl.

The term "aromatic" refers to an array of atoms having a valence of at least one and comprising at least one aromatic group. The array of atoms may include heteroatoms such as nitrogen, sulfur, selenium, silicon and oxygen, or may be composed exclusively of carbon and hydrogen. The aromatic group may also include nonaromatic components. For example, a benzyl group is an aromatic group that comprises a phenyl ring (the aromatic component) and a methylene group (the nonaromatic component). Exemplary aromatic groups include, but are not limited to, phenyl, pyridyl, furanyl, thienyl, naphthyl, biphenyl, 4-trifluoromethylphenyl, 4-chloromethylphen-1-yl, and 3-trichloromethylphen-1-yl (3-CCl₃Ph-).

The term "cycloaliphatic" refers to an array of atoms which is cyclic but which is not aromatic. The cycloaliphatic group may include heteroatoms such as nitrogen, sulfur, selenium, silicon and oxygen, or may be composed exclusively of carbon and hydrogen. A cycloaliphatic group may comprise one or more noncyclic components. For example, a cyclohexylmethyl group ($C_6H_{11}CH_2$) is a cycloaliphatic functionality, which comprises a cyclohexyl ring (the array of atoms which is cyclic but which is not aromatic) and a methylene group (the noncyclic component). Exemplary cycloaliphatic groups include, but are not limited to, cyclopropyl, cyclobutyl, 1,1,4,4-tetramethylcyclobutyl, piperidinyl, and 2,2,6,6-tetramethylpiperydinyl.

In embodiments, the thermoplastic compositions of the present disclosure comprise a polycarbonate polymer (A) having repeating units derived from at least three different monomers as specified further below; and an impact modifier (B). The thermoplastic composition is a blend of the components (A) and (B).

Polycarbonate polymer (A) has repeating units derived from at least three different monomers (i), (II), and (III). Monomer (I) is 2-phenyl-3,3-bis(4-hydroxyphenyl)phthalimidine (PPPBP), having the structure of Formula (A):

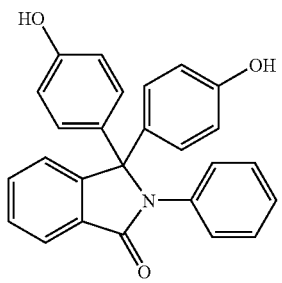

Formula (A)

The para, para form of PPPBP (the hydroxyls being in the para position) is preferred to the ortho-para form, which is an undesired byproduct.

Monomers (II) and (III) are different from each other and are each a dihydroxy compound of formula (I):

Formula (I)

wherein each $R^k$ is independently a halogen atom, a $C_{1-10}$ hydrocarbon group, or a $C_{1-10}$ halogen substituted hydrocarbon group, and n is 0 to 4.

In specific embodiments, one monomer is hydroquinone (HQ) and the other monomer is methylhydroquinone (MeHQ). Hydroquinone is also known as 1,4-dihydroxybenzene; 1,4-benzenediol; 1,4-dihydrobenzoquinone; 4-hydroxyphenol; p-dihydroxybenzene; p-hydroxyphenol; or quinol. Methylhydroquinone is also known as 2-methyl-1,4-benzenediol; 1,4-dihydroxy-2-methylbenzene; 2,5-dihydroxytoluene; 2,5-toluenediol; p-toluhydroquinol; pyrrolin; or tolylhydroquinone. For reference, their structure is shown below:

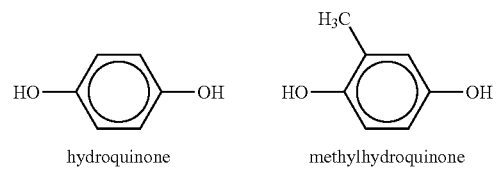

hydroquinone    methylhydroquinone

In some embodiments, the mole ratio of monomer (I) to the sum of monomers (II) and (III) is from about 5:95 to about 95:5. In more specific embodiments, the ratio is from about 20:80 to about 40:60. The mole ratio of monomer (II) to monomer (III) is generally from about 3:4 to about 4:3, including about 1:1.

In particular embodiments, polycarbonate (A) should contain 60 mole percent or higher of monomers (II) and (III) combined. Such polycarbonates will have good chemical resistance and high glass transition temperature. In particular embodiments, the polycarbonate polymer has 66 mole percent or more of monomers (II) and (III) combined and in some embodiments may contain about 80 mole percent of monomers (II) and (III) combined. High hydroquinone content will impart good chemical resistance to the polycarbonate polymer. If the polycarbonate polymer (A) contains more than 40 mole percent of hydroquinone, the polycarbonate polymer has a tendency to crystallize. Such polycarbonates may have a glass transition temperature (Tg) of 165° C. or greater, which makes them suitable for high heat applications. The polycarbonate (A) may also have a weight average molecular weight of 19,000 or greater or about 20,000 or greater, when measured versus polystyrene standards. In other embodiments, the polycarbonate polymer comprises at least 17 mole percent of PPPBP and at least 25 mole percent of methylhydroquinone. In other further embodiments, the polycarbonate polymer comprises at least 17 mole percent of PPPBP and at least 25 mole percent of methylhydroquinone, and at least 60 mole percent of methylhydroquinone and hydroquinone combined.

If desired, polycarbonate (A) may contain additional repeating units derived from additional monomers. In some embodiments, polycarbonate (A) has a fourth monomer (IV), which is bisphenol-A, also known as 4,4'-dihydroxy-2,2-diphenylpropane. The bisphenol-A may comprise from about 10 to about 20 mole percent of the polycarbonate polymer. However, in specific embodiments, the polycarbonate polymer (A) is a terpolymer having repeating units of monomers (I), (II) and (III).

If desired, the composition may include additional polycarbonate polymers besides polycarbonate (A). As used herein, the terms "polycarbonate" and "polycarbonate polymer" mean compositions having repeating structural carbonate units of the formula (1):

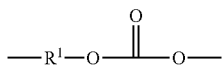

(1)

in which at least about 60 percent of the total number of $R^1$ groups are aromatic organic radicals and the balance thereof are aliphatic, alicyclic, or aromatic radicals. In one embodiment, each $R^1$ is an aromatic organic radical, for example a radical of the formula (2):

$$-A^1-Y^1-A^2- \quad (2)$$

wherein each of $A^1$ and $A^2$ is a monocyclic divalent aryl radical and $Y^1$ is a bridging radical having one or two atoms that separate $A^1$ from $A^2$. In an exemplary embodiment, one atom separates $A^1$ from $A^2$. Illustrative non-limiting examples of radicals of this type are —O—, —S—, —S(O)—, —S(O$_2$)—, —C(O)—, methylene, cyclohexylmethylene, 2-[2.2.1]-bicycloheptylidene, ethylidene, isopropylidene, neopentylidene, cyclohexylidene, cyclopentadecylidene, cyclododecylidene, and adamantylidene. The bridging radical $Y^1$ may be a hydrocarbon group or a saturated hydrocarbon group such as methylene, cyclohexylidene, or isopropylidene.

Polycarbonates may be produced by the interfacial reaction of dihydroxy compounds having the formula HO—$R^1$—OH, wherein $R^1$ is as defined above. Dihydroxy compounds suitable in an interfacial reaction include the dihydroxy compounds of formula (A) as well as dihydroxy compounds of formula (3)

$$HO-A^1-Y^1-A^2-OH \quad (3)$$

wherein $Y^1$, $A^1$ and $A^2$ are as described above. Also included are bisphenol compounds of general formula (4):

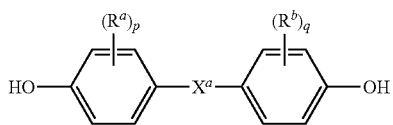

(4)

wherein $R^a$ and $R^b$ each represent a halogen atom or a monovalent hydrocarbon group and may be the same or different; p and q are each independently integers of 0 to 4; and $X^a$ represents one of the groups of formula (5):

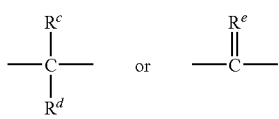

(5)

wherein $R^c$ and $R^d$ each independently represent a hydrogen atom or a monovalent linear or cyclic hydrocarbon group and $R^e$ is a divalent hydrocarbon group.

Some illustrative, non-limiting examples of suitable dihydroxy compounds include the following: resorcinol, 4-bromoresorcinol, hydroquinone, 4,4'-dihydroxybiphenyl, 1,6-dihydroxynaphthalene, 2,6-dihydroxynaphthalene, bis(4-hydroxyphenyl)methane, bis(4-hydroxyphenyl) diphenylmethane, bis(4-hydroxyphenyl)-1-naphthylmethane, 1,2-bis(4-hydroxyphenyl)ethane, 1,1-bis (4-hydroxyphenyl)-1-phenylethane, 2-(4-hydroxyphenyl)-2-(3-hydroxyphenyl)propane, bis(4-hydroxyphenyl)phenylmethane, 2,2-bis(4-hydroxy-3-bromophenyl)propane, 1,1-bis (hydroxyphenyl)cyclopentane, 1,1-bis(4-hydroxyphenyl)cyclohexane, 1,1-bis(4-hydroxyphenyl)isobutene, 1,1-bis(4-hydroxyphenyl)cyclododecane, trans-2,3-bis(4-hydroxyphenyl)-2-butene, 2,2-bis(4-hydroxyphenyl)adamantine, (alpha, alpha'-bis(4-hydroxyphenyl)toluene, bis(4-hydroxyphenyl)acetonitrile, 2,2-bis(3-methyl-4-hydroxyphenyl)propane, 2,2-bis(3-ethyl-4-hydroxyphenyl) propane, 2,2-bis(3-n-propyl-4-hydroxyphenyl)propane, 2,2-bis(3-isopropyl-4-hydroxyphenyl)propane, 2,2-bis(3-sec-butyl-4-hydroxyphenyl)propane, 2,2-bis(3-t-butyl-4-hydroxyphenyl)propane, 2,2-bis(3-cyclohexyl-4-hydroxyphenyl)propane, 2,2-bis(3-allyl-4-hydroxyphenyl) propane, 2,2-bis(3-methoxy-4-hydroxyphenyl)propane, 2,2-bis(4-hydroxyphenyl)hexafluoropropane, 1,1-dichloro-2,2-bis(4-hydroxyphenyl)ethylene, 1,1-dibromo-2,2-bis(4-hydroxyphenyl)ethylene, 1,1-dichloro-2,2-bis(5-phenoxy-4-hydroxyphenyl)ethylene, 4,4'-dihydroxybenzophenone, 3,3-bis(4-hydroxyphenyl)-2-butanone, 1,6-bis(4-hydroxyphenyl)-1,6-hexanedione, ethylene glycol bis(4-hydroxyphenyl)ether, bis(4-hydroxyphenyl)ether, bis(4-hydroxyphenyl)sulfide, bis(4-hydroxyphenyl)sulfoxide, bis (4-hydroxyphenyl)sulfone, 9,9-bis(4-hydroxyphenyl) fluorine, 2,7-dihydroxypyrene, 6,6'-dihydroxy-3,3,3',3'-tetramethylspiro(bis)indane ("spirobiindane bisphenol"), 3,3-bis(4-hydroxyphenyl)phthalide, 2,6-dihydroxydibenzo-p-dioxin, 2,6-dihydroxythianthrene, 2,7-dihydroxyphenoxathin, 2,7-dihydroxy-9,10-dimethylphenazine, 3,6-dihydroxydibenzofuran, 3,6-dihydroxydibenzothiophene, and 2,7-dihydroxycarbazole, and the like, as well as combinations comprising at least one of the foregoing dihydroxy compounds.

Specific examples of the types of bisphenol compounds that may be represented by formula, (3) include 1,1-bis(4-hydroxyphenyl)methane, 1,1-bis(4-hydroxyphenyl)ethane, 2,2-bis(4-hydroxyphenyl)propane (hereinafter "bisphenol-A" or "BPA"), 2,2-bis(4-hydroxyphenyl)butane, 2,2-bis(4-hydroxyphenyl)octane, 1,1-bis(4-hydroxyphenyl)propane, 1,1-bis(4-hydroxyphenyl)n-butane, 2,2-bis(4-hydroxy-1-methylphenyl)propane, and 1,1-bis(4-hydroxy-t-butylphenyl)propane. Combinations comprising at least one of the foregoing dihydroxy compounds may also be used.

Branched polycarbonates are also useful, as well as blends of a linear polycarbonate and a branched polycarbonate. The branched polycarbonates may be prepared by adding a branching agent during polymerization. These branching agents include polyfunctional organic compounds containing at least three functional groups selected from hydroxyl, carboxyl, carboxylic anhydride, haloformyl, and mixtures of the foregoing functional groups. Specific examples include trimellitic acid, trimellitic anhydride, trimellitic trichloride, tris-p-hydroxy phenyl ethane, isatin-bis-phenol, tris-phenol TC (1,3,5-tris((p-hydroxyphenyl)isopropyl)benzene), tris-phenol PA (4(4(1,1-bis(p-hydroxyphenyl)-ethyl) alpha, alpha-dimethyl benzyl)phenol), 4-chloroformyl phthalic anhydride, trimesic acid, and benzophenone tetracarboxylic acid. The branching agents may be added at a level of about 0.05 wt % to about 2.0 wt %. All types of polycarbonate end groups are contemplated as being useful in the polycarbonate composition, provided that such end groups do not significantly affect desired properties of the thermoplastic compositions.

Suitable polycarbonates can be manufactured by processes such as interfacial polymerization and melt polymerization. Although the reaction conditions for interfacial polymerization may vary, an exemplary process generally involves dissolving or dispersing a dihydric phenol reactant in aqueous caustic soda or potash, adding the resulting mixture to a suitable water-immiscible solvent medium, and contacting the reactants with a carbonate precursor in the presence of a suitable catalyst such as triethylamine or a phase transfer catalyst, under controlled pH conditions, e.g., about 8 to about 10. The most commonly used water immiscible solvents include methylene chloride, 1,2-dichloroethane, chlorobenzene, toluene, and the like. Suitable carbonate precursors include, for example, a carbonyl halide such as carbonyl bromide or carbonyl chloride, or a haloformate such as a bishaloformate of a dihydric phenol (e.g., the bischloroformates of bisphenol A, hydroquinone, or the like) or a glycol (e.g., the bishaloformate of ethylene glycol, neopentyl glycol, polyethylene glycol, or the like). Combinations comprising at least one of the foregoing types of carbonate precursors may also be used.

Rather than utilizing the dicarboxylic acid per se, it is possible, and sometimes even preferred, to employ the reactive derivatives of the acid, such as the corresponding acid halides, in particular the acid dichlorides and the acid dibromides. Thus, for example, instead of using isophthalic acid, terephthalic acid, or mixtures thereof, it is possible to employ isophthaloyl dichloride, terephthaloyl dichloride, and mixtures thereof.

Among the phase transfer catalysts that may be used are catalysts of the formula $(R^3)_4Q^+X$, wherein each $R^3$ is the same or different, and is a $C_{1-10}$ alkyl group; Q is a nitrogen or phosphorus atom; and X is a halogen atom or a $C_{1-8}$ alkoxy group or $C_{6-188}$ aryloxy group. Suitable phase transfer catalysts include, for example, $[CH_3(CH_2)_3]_4NX$, $[CH_3(CH_2)_3]_4PX$, $[CH_3(CH_2)_5]_4NX$, $[CH_3(CH_2)_6]_4NX$, $[CH_3(CH_2)_4]_4NX$, $CH_3[CH_3(CH_2)_3]_3NX$, and $CH_3[CH_3(CH_2)_2]_3NX$, wherein X is Cl$^-$, Br$^-$, a $C_{1-8}$ alkoxy group or a $C_{6-18}$ aryloxy group. An effective amount of a phase transfer catalyst may be about 0.1 to about 10 wt % based on the weight of bisphenol in the phosgenation mixture. In another embodiment an effective amount of phase transfer catalyst may be about 0.5 to about 2 wt % based on the weight of bisphenol in the phosgenation mixture.

Alternatively, melt processes may be used to make the polycarbonates. Generally, in the melt polymerization process, polycarbonates may be prepared by co-reacting, in a molten state, the dihydroxy reactant(s) and a diaryl carbonate ester, such as diphenyl carbonate, in the presence of a transesterification catalyst in a Banbury® mixer, twin screw extruder, or the like to form a uniform dispersion. Volatile monohydric phenol is removed from the molten reactants by distillation and the polymer is isolated as a molten residue.

In embodiments, the diaryl carbonate ester is an activated carbonate. As used herein, the term "activated carbonate" is defined as a diaryl carbonate which is more reactive than diphenylcarbonate toward transesterification reactions. Such activated carbonates are of the general formula:

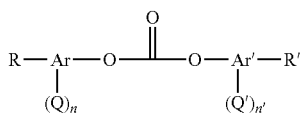

wherein Q and Q' are independently activating groups; Ar and Ar' are independently aromatic rings; n and n' are independently whole numbers from zero up to the number of replaceable hydrogen groups substituted on the aromatic rings Ar and Ar', wherein n+n' is greater than or equal to 1; and R and R' are independently selected from alkyl, substituted alkyl, cycloalkyl, alkoxy, aryl, alkylaryl having from 1 to 30 carbon atoms, cyano, nitro, halogen, and carboalkoxy. The number of R groups is a whole number and can be zero up to the number of replaceable hydrogen groups on the aromatic ring Ar minus the number n. The number of R' groups are a whole number and can be zero up to the number of replaceable hydrogen groups on the aromatic ring Ar' minus the number n'. The number and type of the R and R' substituents on the aromatic rings Ar and Ar' are not limited unless they deactivate the carbonate and lead to a carbonate which is less reactive than diphenylcarbonate. Typically, the R and R' substituents are located in the para, ortho, or a combination of the two positions.

Non-limiting examples of activating groups Q and Q' are: alkoxycarbonyl groups, halogens, nitro groups, amide groups, sulfone groups, sulfoxide groups, imine groups, and cyano groups.

Specific and non-limiting examples of activated carbonates include: bis(o-methoxycarbonylphenyl)carbonate; bis(o-chlorophenyl)carbonate; bis(o-nitrophenyl)carbonate; bis(o-acetylphenyl)carbonate; bis(o-phenylketonephenyl)carbonate; bis(o-formylphenyl)carbonate; and bis(o-cyanophenyl)carbonate. Unsymmetrical combinations of these structures, where the substitution number and type on Ar and Ar' are different, may also be used.

Especially desirable ester-substituted diaryl carbonates have the structure:

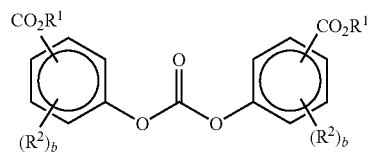

wherein $R^1$ is independently a $C_1$-$C_{20}$ alkyl radical, $C_4$-$C_{20}$ cycloalkyl radical, or $C_4$-$C_{20}$ aromatic radical; $R^2$ is independently a halogen atom, cyano group, nitro group, $C_1$-$C_{20}$ alkyl radical, $C_4$-$C_{20}$ cycloalkyl radical, $C_4$-$C_{20}$ aromatic radical, $C_1$-$C_{20}$ alkoxy radical, $C_4$-$C_{20}$ cycloalkoxy radical, $C_4$-$C_{20}$ aryloxy radical, $C_1$-$C_{20}$ alkylthio radical, $C_4$-$C_{20}$ cycloalkylthio radical, $C_4$-$C_{20}$ arylthio radical, $C_1$-$C_{20}$ alkylsulfinyl radical, $C_4$-$C_{20}$ cycloalkylsulfinyl radical, $C_4$-$C_{20}$ arylsulfinyl radical, $C_1$-$C_{20}$ alkylsulfonyl radical, $C_4$-$C_{20}$ cycloalkylsulfonyl radical, $C_4$-$C_{20}$ arylsulfonyl radical, $C_1$-$C_{20}$ alkoxycarbonyl radical, $C_4$-$C_{20}$ cycloalkoxycarbonyl radical, $C_4$-$C_{20}$ aryloxycarbonyl radical, $C_2$-$C_{60}$ alkylamino radical, $C_6$-$C_{60}$ cycloalkylamino radical, $C_5$-$C_{60}$ arylamino radical, $C_1$-$C_{40}$ alkylaminocarbonyl radical, $C_4$-$C_{40}$ cycloalkylaminocarbonyl radical, $C_4$-$C_{40}$ arylaminocarbonyl radical, or $C_1$-$C_{20}$ acylamino radical; and b is independently at each occurrence an integer from zero to 4. At least one of the substituents $CO_2R^1$ is preferably attached in an ortho position relative to the carbonate group.

Exemplary ester-substituted diaryl carbonates include, but are not limited to, bis(methylsalicyl)carbonate (also referred to as BMSC) (CAS Registry No. 82091-12-1), bis(ethyl salicyl)carbonate, bis(propyl salicyl)carbonate, bis(butylsalicyl) carbonate, bis(benzyl salicyl)carbonate, bis(methyl 4-chlorosalicyl)carbonate and the like. Typically bis(methylsalicyl) carbonate is desired for use in melt polycarbonate synthesis due to its preparation from less expensive raw materials, lower molecular weight and higher vapor pressure.

One method for determining whether a certain diaryl carbonate is activated or is not activated is to carry out a model transesterification reaction between the certain diaryl carbonate with a phenol such as para-cumyl phenol. This phenol is preferred because it possesses only one reactive site, possesses a low volatility, and possesses a similar reactivity to bisphenol-A. The model transesterification reaction is carried out at temperatures above the melting points of the certain diaryl carbonate and para-cumyl phenol and in the presence of a transesterification catalyst, which is usually an aqueous solution of sodium hydroxide or sodium phenoxide. Preferred concentrations of the transesterification catalyst are about 0.001 mole % based on the number of moles of the phenol or diary carbonate. A preferred reaction temperature is 200° C. The choice of conditions and catalyst concentration can be adjusted depending on the reactivity of the reactants and melting points of the reactants to provide a convenient reaction rate. The only limitation to reaction temperature is that the temperature must be below the degradation temperature of the reactants. Sealed tubes can be used if the reaction temperatures cause the reactants to volatilize and affect the reactant molar balance. The determination of the equilibrium concentration of reactants is accomplished through reaction sampling during the course of the reaction and then analysis of the reaction mixture using a well-know detection method to those skilled in the art such as HPLC (high pressure liquid chromatography). Particular care needs to be taken so that reaction does not continue after the sample has been removed from the reaction vessel. This is accomplished by cooling down the sample in an ice bath and by employing a reaction quenching acid such as acetic acid in the water phase of the HPLC solvent system. It may also be desirable to introduce a reaction quenching acid directly into the reaction sample in addition to cooling the reaction mixture. A preferred concentration for the acetic acid in the water phase of the HPLC solvent system is 0.05% (v/v). The equilibrium constant can be determined from the concentration of the reactants and product when equilibrium is reached. Equilibrium is assumed to have been reached when the concentration of components in the reaction mixture reach a point of little or no change on sampling of the reaction mixture. The equilibrium constant can be determined from the concentration of the reactants and products at equilibrium by methods well known to those skilled in the art. A diaryl carbonate which possesses an equilibrium constant of greater than 1 is considered to possess a more favorable equilibrium than diphenylcarbonate and is an activated carbonate, whereas a diaryl carbonate which possesses an equilibrium constant of 1 or less is considered to possess the same or a less favorable equilibrium than diphenylcarbonate and is considered not to be activated. It is generally preferred to employ an activated carbonate with very high reactivity compared to diphenylcarbonate when conducting transesterification reactions. Preferred are activated carbonates with an equilibrium constant greater than at least 10 times that of diaryl carbonate.

Some non-limiting examples of non-activating groups which, when present in an ortho position relative to the carbonate group, would not be expected to result in activated carbonates are alkyl and cycloalkyl. Some specific and non-limiting examples of non-activated carbonates are bis(o-methylphenyl)carbonate, bis(p-cumylphenyl)carbonate, and bis (p-(1,1,3,3-tetramethyl)butylphenyl)carbonate.
Unsymmetrical combinations of these structures are also expected to result in non-activated carbonates.

"Polycarbonates" and "polycarbonate polymers" as used herein further includes blends of polycarbonates with other copolymers comprising carbonate chain units. An exemplary copolymer is a polyester carbonate, also known as a copoly-ester-polycarbonate. Such copolymers further contain, in addition to recurring carbonate chain units of the formula (1), repeating units of formula (6)

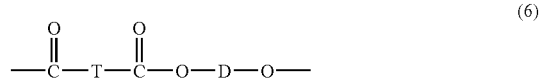

wherein D is a divalent radical derived from a dihydroxy compound, and may be, for example, a $C_{2-10}$ alkylene radical, a $C_{6-20}$ alicyclic radical, a $C_{6-20}$ aromatic radical or a polyoxyalkylene radical in which the alkylene groups contain 2 to about 6 carbon atoms, specifically 2, 3, or 4 carbon atoms; and T is a divalent radical derived from a dicarboxylic acid, and may be, for example, a $C_{2-10}$ alkylene radical, a $C_{6-20}$ alicyclic radical, a $C_{6-20}$ alkyl aromatic radical, or a $C_{6-20}$ aromatic radical.

In one embodiment, D is a $C_{2-6}$ alkylene radical. In another embodiment, D is derived from an aromatic dihydroxy compound of formula (7):

wherein each $R^k$ is independently a halogen atom, a $C_{1-10}$ hydrocarbon group, or a $C_{1-10}$ halogen substituted hydrocarbon group, and n is 0 to 4. The halogen is usually bromine. Examples of compounds that may be represented by the formula (7) include resorcinol, substituted resorcinol compounds such as 5-methyl resorcinol, 5-ethyl resorcinol, 5-propyl resorcinol, 5-butyl resorcinol, 5-t-butyl resorcinol, 5-phenyl resorcinol, 5-cumyl resorcinol, 2,4,5,6-tetrafluoro resorcinol, 2,4,5,6-tetrabromo resorcinol, or the like; catechol; hydroquinone; substituted hydroquinones such as 2-methyl hydroquinone, 2-ethyl hydroquinone, 2-propyl hydroquinone, 2-butyl hydroquinone, 2-t-butyl hydroquinone, 2-phenyl hydroquinone, 2-cumyl hydroquinone, 2,3,5,6-tetramethyl hydroquinone, 2,3,5,6-tetra-t-butyl hydroquinone, 2,3,5,6-tetrafluoro hydroquinone, 2,3,5,6-tetrabromo hydroquinone, or the like; or combinations comprising at least one of the foregoing compounds.

Examples of aromatic dicarboxylic acids that may be used to prepare the polyesters include isophthalic or terephthalic acid, 1,2-di(p-carboxyphenyl)ethane, 4,4'-dicarboxydiphenyl ether, 4,4'-bisbenzoic acid, and mixtures comprising at least one of the foregoing acids. Acids containing fused rings can also be present, such as in 1,4-, 1,5-, or 2,6-naphthalenedicarboxylic acids. Specific dicarboxylic acids are terephthalic acid, isophthalic acid, naphthalene dicarboxylic acid, cyclohexane dicarboxylic acid, or mixtures thereof. A specific dicarboxylic acid comprises a mixture of isophthalic acid and terephthalic acid wherein the weight ratio of terephthalic acid to isophthalic acid is about 10:1 to about 0.2:9.8. In another specific embodiment, D is a $C_{2-6}$ alkylene radical and T is p-phenylene, m-phenylene, naphthalene, a divalent cycloaliphatic radical, or a mixture thereof. This class of polyester includes the poly(alkylene terephthalates).

In other embodiments, poly(alkylene terephthalates) may be used. Specific examples of suitable poly(alkylene terephthalates) are poly(ethylene terephthalate) (PET), poly(1,4-butylene terephthalate) (PBT), poly(ethylene naphthanoate) (PEN), poly(butylene naphthanoate), (PBN), (polypropylene terephthalate) (PPT), polycyclohexanedimethanol terephthalate (PCT), and combinations comprising at least one of the foregoing polyesters. Also contemplated are the above polyesters with a minor amount, e.g., from about 0.5 to about 10 percent by weight, of units derived from an aliphatic diacid and/or an aliphatic polyol to make copolyesters.

Copolymers comprising alkylene terephthalate repeating ester units with other ester groups may also be useful. Useful ester units may include different alkylene terephthalate units, which can be present in the polymer chain as individual units, or as blocks of poly(alkylene terephthalates). Specific examples of such copolymers include poly(cyclohexanedimethylene terephthalate)-co-poly(ethylene terephthalate), abbreviated as PETG where the polymer comprises greater than or equal to 50 mol % of poly(ethylene terephthalate), and abbreviated as PCTG where the polymer comprises greater than 50 mol % of poly(1,4-cyclohexanedimethylene terephthalate).

Poly(cycloalkylene diester)s may also include poly(alkylene cyclohexanedicarboxylate)s. Of these, a specific example is poly(1,4-cyclohexane-dimethanol-1,4-cyclohexanedicarboxylate) (PCCD), having recurring units of formula (8):

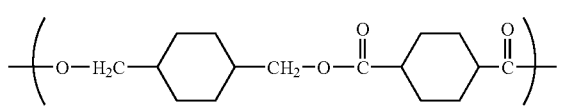

(8)

wherein, as described using formula (6), $R^2$ is a 1,4-cyclohexanedimethylene group derived from 1,4-cyclohexanedimethanol, and T is a cyclohexane ring derived from cyclohexanedicarboxylate or a chemical equivalent thereof, and may comprise the cis-isomer, the trans-isomer, or a combination comprising at least one of the foregoing isomers.

Another exemplary copolymer comprises polycarbonate blocks and polydiorganosiloxane blocks, also known as a polycarbonate-polysiloxane copolymer. The polycarbonate blocks in the copolymer comprise repeating structural units of formula (1) as described above, for example wherein $R^1$ is of formula (2) as described above. These units may be derived from reaction of dihydroxy compounds of formula (3) as described above.

The polydiorganosiloxane blocks comprise repeating structural units of formula (9) (sometimes referred to herein as 'siloxane'):

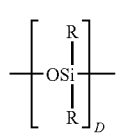

(9)

wherein each occurrence of R is same or different, and is a $C_{1-13}$ monovalent organic radical. For example, R may be a $C_1$-$C_{13}$ alkyl group, $C_1$-$C_{13}$ alkoxy group, $C_2$-$C_{13}$ alkenyl group, $C_2$-$C_{13}$ alkenyloxy group, $C_3$-$C_6$ cycloalkyl group, $C_3$-$C_6$ cycloalkoxy group, $C_6$-$C_{10}$ aryl group, $C_6$-$C_{10}$ aryloxy group, $C_7$-$C_{13}$ aralkyl group, $C_7$-$C_{13}$ aralkoxy group, $C_7$-$C_{13}$ alkaryl group, or $C_7$-$C_{13}$ alkaryloxy group. Combinations of the foregoing R groups may be used in the same copolymer.

The value of D in formula (9) may vary widely depending on the type and relative amount of each component in the thermoplastic composition, the desired properties of the composition, and like considerations. Generally, D may have an average value of 2 to about 1000, specifically about 2 to about 500, more specifically about 5 to about 100. In one embodiment, D has an average value of about 10 to about 75, and in still another embodiment, D has an average value of about 40 to about 60. Where D is of a lower value, e.g., less than about 40, it may be desirable to use a relatively larger amount of the polycarbonate-polysiloxane copolymer. Conversely, where D is of a higher value, e.g., greater than about 40, it may be necessary to use a relatively lower amount of the polycarbonate-polysiloxane copolymer.

A combination of a first and a second (or more) polycarbonate-polysiloxane copolymers may be used, wherein the average value of D of the first copolymer is less than the average value of D of the second copolymer.

In one embodiment, the polydiorganosiloxane blocks are provided by repeating structural units of formula (10):

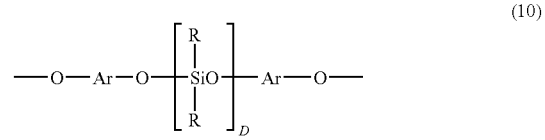

(10)

wherein D is as defined above; each R may be the same or different, and is as defined above; and Ar may be the same or different, and is a substituted or unsubstituted $C_6$-$C_{30}$ arylene radical, wherein the bonds are directly connected to an aromatic moiety. Suitable Ar groups in formula (10) may be derived from a $C_6$-$C_{30}$ dihydroxyarylene compound, for example a dihydroxyarylene compound of formula (3), (4), or (7) above. Combinations comprising at least one of the foregoing dihydroxyarylene compounds may also be used. Specific examples of suitable dihydroxyarlyene compounds are 1,1-bis(4-hydroxyphenyl)methane, 1,1-bis(4-hydroxyphenyl)ethane, 2,2-bis(4-hydroxyphenyl)propane, 2,2-bis(4-hydroxyphenyl)butane, 2,2-bis(4-hydroxyphenyl)octane, 1,1-bis(4-hydroxyphenyl)propane, 1,1-bis(4-hydroxyphenyl)n-butane, 2,2-bis(4-hydroxy-1-methylphenyl)propane, 1,1-bis(4-hydroxyphenyl)cyclohexane, bis(4-hydroxyphenyl sulphide), and 1,1-bis(4-hydroxy-t-butylphenyl)propane. Combinations comprising at least one of the foregoing dihydroxy compounds may also be used.

Such units may be derived from the corresponding dihydroxy compound of the following formula (11):

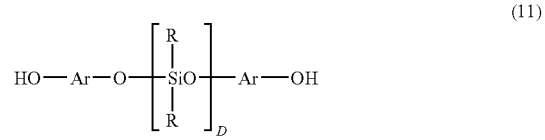

(11)

wherein Ar and D are as described above. Such compounds are further described in U.S. Pat. No. 4,746,701 to Kress et al. Compounds of this formula may be obtained by the reaction of a dihydroxyarylene compound with, for example, an alpha, omega-bisacetoxypolydiorangonosiloxane under phase transfer conditions.

In another embodiment the polydiorganosiloxane blocks comprise repeating structural units of formula (12):

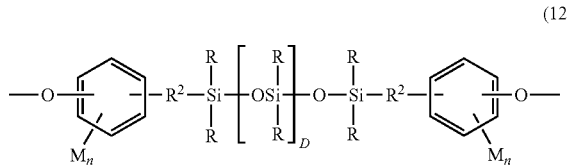

wherein R and D are as defined above. $R^2$ in formula (12) is a divalent $C_2$-$C_8$ aliphatic group. Each M in formula (12) may be the same or different, and may be a halogen, cyano, nitro, $C_1$-$C_8$ alkylthio, $C_1$-$C_8$ alkyl, $C_1$-$C_8$ alkoxy, $C_2$-$C_8$ alkenyl, $C_2$-$C_8$ alkenyloxy group, $C_3$-$C_8$ cycloalkyl, $C_3$-$C_8$ cycloalkoxy, $C_6$-$C_{10}$ aryl, $C_6$-$C_{10}$ aryloxy, $C_7$-$C_{12}$ aralkyl, $C_7$-$C_{12}$ aralkoxy, $C_7$-$C_{12}$ alkaryl, or $C_7$-$C_{12}$ alkaryloxy, wherein each n is independently 0, 1,2,3, or 4.

In one embodiment, M is bromo or chloro, an alkyl group such as methyl, ethyl, or propyl, an alkoxy group such as methoxy, ethoxy, or propoxy, or an aryl group such as phenyl, chlorophenyl, or tolyl; $R^2$ is a dimethylene, trimethylene or tetramethylene group; and R is a $C_{1-8}$ alkyl, haloalkyl such as trifluoropropyl, cyanoalkyl, or aryl such as phenyl, chlorophenyl or tolyl. In another embodiment, R is methyl, or a mixture of methyl and trifluoropropyl, or a mixture of methyl and phenyl. In still another embodiment, M is methoxy, n is one, $R^2$ is a divalent $C_1$-$C_3$ aliphatic group; and R is methyl.

These units may be derived from the corresponding dihydroxy polydiorganosiloxane (13):

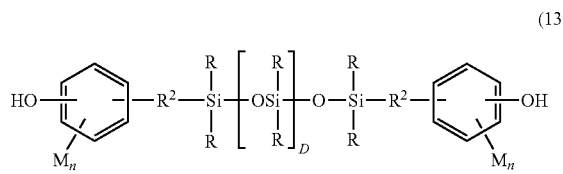

wherein R, D, M, $R^2$, and n are as described above.

Such dihydroxy polysiloxanes can be made by effecting a platinum catalyzed addition between a siloxane hydride of the formula (14),

wherein R and D are as previously defined, and an aliphatically unsaturated monohydric phenol. Suitable aliphatically unsaturated monohydric phenols included, for example, eugenol, 2-alkylphenol, 4-allyl-2-methylphenol, 4-allyl-2-phenylphenol, 4-allyl-2-bromophenol, 4-allyl-2-t-butoxyphenol, 4-phenyl-2-phenylphenol, 2-methyl-4-propylphenol, 2-allyl-4,6-dimethylphenol, 2-allyl-4-bromo-6-methylphenol, 2-allyl-6-methoxy-4-methylphenol and 2-allyl-4,6-dimethylphenol. Mixtures comprising at least one of the foregoing may also be used.

A polycarbonate-polysiloxane copolymer may be manufactured by reaction of diphenolic polysiloxane (13) with a carbonate source and a dihydroxy aromatic compound of formula (3), optionally in the presence of a phase transfer catalyst as described above. Suitable conditions are similar to those useful in forming polycarbonates. For example, the copolymers are prepared by phosgenation, at temperatures from below 0° C. to about 100° C., preferably about 25° C. to about 50° C. Since the reaction is exothermic, the rate of phosgene addition may be used to control the reaction temperature. The amount of phosgene required will generally depend upon the amount of the dihydric reactants. Alternatively, the polycarbonate-polysiloxane copolymers may be prepared by co-reacting in a molten state, the dihydroxy monomers and a diaryl carbonate ester, such as diphenyl carbonate, in the presence of a transesterification catalyst as described above.

In the production of a polycarbonate-polysiloxane copolymer, the amount of dihydroxy polydiorganosiloxane is selected so as to provide the desired amount of polydiorganosiloxane units in the copolymer. The amount of polydiorganosiloxane units may vary widely, i.e., may be about 1 wt % to about 99 wt % of polydimethylsiloxane, or an equivalent molar amount of another polydiorganosiloxane, with the balance being carbonate units. The particular amounts used will therefore be determined depending on desired physical properties of the thermoplastic composition, the value D (within the range of 2 to about 1000), and the type and relative amount of each component in the thermoplastic composition, including the type and amount of polycarbonate, type and amount of impact modifier, type and amount of polycarbonate-polysiloxane copolymer, and type and amount of any other additives. Suitable amounts of dihydroxy polydiorganosiloxane can be determined by one of ordinary skill in the art without undue experimentation using the guidelines taught herein. For example, the amount of dihydroxy polydiorganosiloxane may be selected so as to produce a copolymer comprising about 1 wt % to about 75 wt %, or about 1 wt % to about 50 wt % polydimethylsiloxane, or an equivalent molar amount of another polydiorganosiloxane. In one embodiment, the copolymer comprises about 5 wt % to about 40 wt %, optionally about 5 wt % to about 25 wt % polydimethylsiloxane, or an equivalent molar amount of another polydiorganosiloxane, with the balance being polycarbonate. In a particular embodiment, the copolymer may comprise about 20 wt % siloxane.

The thermoplastic composition further comprises one or more impact modifiers (B) to increase the impact strength of the thermoplastic composition. The impact modifier may include an elastomer-modified graft copolymer comprising (i) an elastomeric (i.e., rubbery) polymer substrate having a Tg less than about 10° C., more specifically less than about −10° C., or more specifically about −40° C. to −80° C., and (ii) a rigid polymeric superstrate grafted to the elastomeric polymer substrate. As is known, elastomer-modified graft copolymers may be prepared by first providing the elastomeric polymer, then polymerizing the constituent monomer(s) of the rigid phase in the presence of the elastomer to obtain the graft copolymer. The grafts may be attached as graft branches or as shells to an elastomer core. The shell may merely physically encapsulate the core, or the shell may be partially or essentially completely grafted to the core.

Suitable materials for use as the elastomer phase include, for example, conjugated diene rubbers; copolymers of a conjugated diene with less than about 50 wt % of a copolymerizable monomer; olefin rubbers such as ethylene propylene copolymers (EPR) or ethylene-propylene-diene monomer rubbers (EPDM); ethylene-vinyl acetate rubbers; silicone rubbers; elastomeric $C_{1-8}$ alkyl (meth)acrylates; elastomeric copolymers of $C_{1-8}$ alkyl (meth)acrylates with butadiene and/or styrene; or combinations comprising at least one of the foregoing elastomers. As used herein, the terminology "(meth)acrylate monomers" refers collectively to acrylate monomers and methacrylate monomers.

Suitable conjugated diene monomers for preparing the elastomer phase are of formula (15):

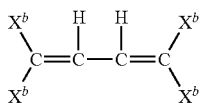
(15)

wherein each $X^b$ is independently hydrogen, $C_1$-$C_5$ alkyl, or the like. Examples of conjugated diene monomers that may be used are butadiene, isoprene, 1,3-heptadiene, methyl-1,3-pentadiene, 2,3-dimethyl-1,3-butadiene, 2-ethyl-1,3-pentadiene; 1,3- and 2,4-hexadienes, and the like, as well as mixtures comprising at least one of the foregoing conjugated diene monomers. Specific conjugated diene homopolymers include polybutadiene and polyisoprene.

Copolymers of a conjugated diene rubber may also be used, for example those produced by aqueous radical emulsion polymerization of a conjugated diene and one or more monomers copolymerizable therewith. Monomers that are suitable for copolymerization with the conjugated diene include monovinylaromatic monomers containing condensed aromatic ring structures, such as vinyl naphthalene, vinyl anthracene and the like, or monomers of formula (16):

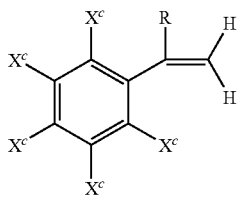
(16)

wherein each $X^c$ is independently hydrogen, $C_1$-$C_{12}$ alkyl, $C_3$-$C_{12}$ cycloalkyl, $C_6$-$C_{12}$ aryl, $C_7$-$C_{12}$ aralkyl, $C_7$-$C_{12}$ alkaryl, $C_1$-$C_{12}$ alkoxy, $C_3$-$C_{12}$ cycloalkoxy, $C_6$-$C_{12}$ aryloxy, chloro, bromo, or hydroxy, and R is hydrogen, $C_1$-$C_5$ alkyl, bromo, or chloro. Examples of suitable monovinylaromatic monomers that may be used include styrene, 3-methylstyrene, 3,5-diethylstyrene, 4-n-propylstyrene, alpha-methylstyrene, alpha-methyl vinyltoluene, alpha-chlorostyrene, alpha-bromostyrene, dichlorostyrene, dibromostyrene, tetrachlorostyrene, and the like, and combinations comprising at least one of the foregoing compounds. Styrene and/or alpha-methylstyrene may be used as monomers copolymerizable with the conjugated diene monomer.

Other monomers that may be copolymerized with the conjugated diene are monovinylic monomers such as itaconic acid, acrylamide, N-substituted acrylamide or methacrylamide, maleic anhydride, maleimide, N-alkyl-, aryl-, or haloaryl-substituted maleimide, glycidyl (meth)acrylates, and monomers of the generic formula (17):

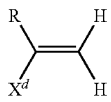
(17)

wherein R is hydrogen, $C_1$-$C_5$ alkyl, bromo, or chloro, and $X^d$ is cyano, $C_1$-$C_{12}$ alkoxycarbonyl, $C_1$-$C_{12}$ aryloxycarbonyl, hydroxy carbonyl, or the like. Examples of monomers of formula (17) include acrylonitrile, ethacrylonitrile, methacrylonitrile, alpha-chloroacrylonitrile, beta-chloroacrylonitrile, alpha-bromoacrylonitrile, acrylic acid, methyl (meth)acrylate, ethyl (meth)acrylate, n-butyl (meth)acrylate, t-butyl (meth)acrylate, n-propyl (meth)acrylate, isopropyl (meth)acrylate, 2-ethylhexyl (meth)acrylate, and the like, and combinations comprising at least one of the foregoing monomers. Monomers such as n-butyl acrylate, ethyl acrylate, and 2-ethylhexyl acrylate are commonly used as monomers copolymerizable with the conjugated diene monomer. Mixtures of the foregoing monovinyl monomers and monovinylaromatic monomers may also be used.

A second type of grafting monomer that may be polymerized in the presence of the polymer backbone are acrylic monomers of formula (18):

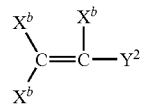
(18)

wherein $X^b$ is as previously defined and $Y^2$ is cyano, $C_1$-$C_{12}$ alkoxycarbonyl, or the like. Examples of such acrylic monomers include acrylonitrile, ethacrylonitrile, methacrylonitrile, alpha-chloroacrylonitrile, beta-chloroacrylonitrile, alpha-bromoacrylonitrile, beta-bromoacrylonitrile, methyl acrylate, methyl methacrylate, ethyl acrylate, butyl acrylate, propyl acrylate, isopropyl acrylate, mixtures comprising at least one of the foregoing monomers, and the like.

Suitable (meth)acrylate monomers suitable for use as the elastomeric phase may be cross-linked, particulate emulsion homopolymers or copolymers of $C_{1-8}$ alkyl (meth)acrylates, in particular $C_{4-6}$ alkyl acrylates, for example n-butyl acrylate, t-butyl acrylate, n-propyl acrylate, isopropyl acrylate, 2-ethylhexyl acrylate, and the like, and combinations comprising at least one of the foregoing monomers. The $C_{1-8}$ alkyl (meth)acrylate monomers may optionally be polymerized in admixture with up to 15 wt % of comonomers of formulas (15), (16), (17), or (18). Exemplary comonomers include but are not limited to butadiene, isoprene, styrene, methyl methacrylate, phenyl methacrylate, penethylmethacrylate, N-cyclohexylacrylamide, vinyl methyl ether or acrylonitrile, and mixtures comprising at least one of the foregoing comonomers. Optionally, up to 5 wt % a polyfunctional crosslinking comonomer may be present, for example divinylbenzene, alkylenediol di(meth)acrylates such as glycol bisacrylate, alkylenetriol tri(meth)acrylates, polyester di(meth)acrylates, bisacrylamides, triallyl cyanurate, triallyl isocyanurate, allyl (meth)acrylate, diallyl maleate, diallyl fumarate, diallyl adipate, triallyl esters of citric acid, triallyl esters of phosphoric acid, and the like, as well as combinations comprising at least one of the foregoing crosslinking agents.

The elastomer phase may be polymerized by mass, emulsion, suspension, solution or combined processes such as bulk-suspension, emulsion-bulk, bulk-solution or other techniques, using continuous, semibatch, or batch processes. The particle size of the elastomer substrate is not critical. For example, an average particle size of about 0.001 to about 25 micrometers, specifically about 0.01 to about 15 micrometers, or even more specifically about 0.1 to about 8 micrometers may be used for emulsion based polymerized rubber lattices. A particle size of about 0.5 to about 10 micrometers, specifically about 0.6 to about 1.5 micrometers may be used for bulk polymerized rubber substrates. Particle size may be measured by simple light transmission methods or capillary hydrodynamic chromatography (CHDF). The elastomer phase may be a particulate, moderately cross-linked conjugated butadiene or $C_{4-6}$ alkyl acrylate rubber, and desirably has a gel content greater than 70%. Also suitable are mixtures of butadiene with styrene and/or $C_{4-6}$ alkyl acrylate rubbers.

The elastomeric phase may provide about 5 wt % to about 95 wt % of the total graft copolymer, more specifically about 20 wt % to about 90 wt %, and even more specifically about 40 wt % to about 85 wt % of the elastomer-modified graft copolymer, the remainder being the rigid graft phase.

The rigid phase of the elastomer-modified graft copolymer may be formed by graft polymerization of a mixture comprising a monovinylaromatic monomer and optionally one or more comonomers in the presence of one or more elastomeric polymer substrates. The above-described monovinylaromatic monomers of formula (16) may be used in the rigid graft phase, including styrene, alpha-methyl styrene, halostyrenes such as dibromostyrene, vinyltoluene, vinylxylene, butylstyrene, para-hydroxystyrene, methoxystyrene, or the like, or combinations comprising at least one of the foregoing monovinylaromatic monomers. Suitable comonomers include, for example, the above-described monovinylic monomers and/or monomers of the general formula (17). In one embodiment, R is hydrogen or $C_1$-$C_2$ alkyl, and $X^d$ is cyano or $C_1$-$C_{12}$ alkoxycarbonyl. Specific, examples of suitable comonomers for use in the rigid phase include acrylonitrile; ethacrylonitrile, methacrylonitrile, methyl (meth)acrylate, ethyl (meth)acrylate, n-propyl (meth)acrylate, isopropyl (meth)acrylate, and the like, and combinations comprising at least one of the foregoing comonomers.

The relative ratio of monovinylaromatic monomer and comonomer in the rigid graft phase may vary widely depending on the type of elastomer substrate, type of monovinylaromatic monomer(s), type of comonomer(s), and the desired properties of the impact modifier. The rigid phase may generally comprise up to 100 wt % of monovinyl aromatic monomer, specifically about 30 to about 100 wt %, more specifically about 50 to about 90 wt % monovinylaromatic monomer, with the balance being comonomer(s).

Depending on the amount of elastomer-modified polymer present, a separate matrix or continuous phase of ungrafted rigid polymer or copolymer may be simultaneously obtained along with the elastomer-modified graft copolymer. Typically, such impact modifiers comprise about 40 wt % to about 95 wt % elastomer-modified graft copolymer and about 5 wt % to about 65 wt % graft (co)polymer, based on the total weight of the impact modifier. In another embodiment, such impact modifiers comprise about 50 wt % to about 85 wt %, more specifically about 75 wt % to about 85 wt % rubber-modified graft copolymer, together with about 15 wt % to about 50 wt %, more specifically about 15 wt % to about 25 wt % graft (co)polymer, based on the total weight of the impact modifier.

Another specific type of elastomer-modified impact modifier comprises structural units derived from at least one silicone rubber monomer, a branched acrylate rubber monomer having the formula $H_2C=C(R^g)C(O)OCH_2CH_2R^h$, wherein $R^g$ is hydrogen or a $C_1$-$C_8$ linear or branched hydrocarbyl group and $R^h$ is a branched $C_3$-$C_{16}$ hydrocarbyl group; a first graft link monomer; a polymerizable alkenyl-containing organic material; and a second graft link monomer. The silicone rubber monomer may comprise, for example, a cyclic siloxane, tetraalkoxysilane, trialkoxysilane, (acryloxy)alkoxysilane, (mercaptoalkyl)alkoxysilane, vinylalkoxysilane, or allylalkoxysilane, alone or in combination, e.g., decamethylcyclopentasiloxane, dodecamethylcyclohexasiloxane, trimethyltriphenylcyclotrisiloxane, tetramethyltetraphenylcyclotetrasiloxane, tetramethyltetravinylcyclotetrasiloxane, octaphenylcyclotetrasiloxane, octamethylcyclotetrasiloxane and/or tetraethoxysilane.

Exemplary branched acrylate rubber monomers include iso-octyl acrylate, 6-methyloctyl acrylate, 7-methyloctyl acrylate, 6-methylheptyl acrylate, and the like, alone or in combination. The polymerizable alkenyl-containing organic material may be, for example, a monomer of formula (16) or (17), e.g., styrene, alpha-methylstyrene, acrylonitrile, methacrylonitrile, or an unbranched (meth)acrylate such as methyl methacrylate, 2-ethylhexyl methacrylate, methyl acrylate, ethyl acrylate, n-propyl acrylate, or the like, alone or in combination.

The at least one first graft link monomer may be an (acryloxy)alkoxysilane, a (mercaptoalkyl)alkoxysilane, a vinylalkoxysilane, or an allylalkoxysilane, alone or in combination, e.g., (gamma-methacryloxypropyl)(dimethoxy)methylsilane and/or (3-mercaptopropyl)trimethoxysilane. The at least one second graft link monomer is a polyethylenically unsaturated compound having at least one allyl group, such as allyl methacrylate, triallyl cyanurate, or triallyl isocyanurate, alone or in combination.

The silicone-acrylate impact modifier compositions can be prepared by emulsion polymerization, wherein, for example at least one silicone rubber monomer is reacted with at least one first graft link monomer at a temperature from about 30° C. to about 110° C. to form a silicone rubber latex, in the presence of a surfactant such as dodecylbenzenesulfonic acid. Alternatively, a cyclic siloxane such as cyclooctamethyltetrasiloxane and a tetraethoxyorthosilicate may be reacted with a first graft link monomer such as (gamma-methacryloxypropyl)methyldimethoxysilane, to afford silicone rubber having an average particle size from about 100 nanometers to about 2 micrometers. At least one branched acrylate rubber monomer is then polymerized with the silicone rubber particles, optionally in the presence of a cross linking monomer, such as allylmethacrylate in the presence of a free radical generating polymerization catalyst such as benzoyl peroxide. This latex is then reacted with a polymerizable alkenyl-containing organic material and a second graft link monomer. The latex particles of the graft silicone-acrylate rubber hybrid may be separated from the aqueous phase through coagulation (by treatment with a coagulant) and dried to a fine powder to produce the silicone-acrylate rubber impact modifier composition. This method can be generally used for producing the silicone-acrylate impact modifier having a particle size from about 100 nanometers to about two micrometers.

Processes known for the formation of the foregoing elastomer-modified graft copolymers include mass, emulsion, suspension, and solution processes, or combined processes such as bulk-suspension, emulsion-bulk, bulk-solution or other techniques, using continuous, semibatch, or batch processes.

If desired, the foregoing types of impact modifiers may be prepared by an emulsion polymerization process that is free of basic materials such as alkali metal salts of $C_{6-30}$ fatty acids, for example sodium stearate, lithium stearate, sodium oleate, potassium oleate, and the like, alkali metal carbonates, amines such as dodecyl dimethyl amine, dodecyl amine, and the like, and ammonium salts of amines, or any other material, such as an acid, that contains a degradation catalyst. Such materials are commonly used as surfactants in emulsion polymerization, and may catalyze transesterification and/or degradation of polycarbonates. Instead, ionic sulfate, sulfonate or phosphate surfactants may be used in preparing the impact modifiers, particularly the elastomeric substrate portion of the impact modifiers. Suitable surfactants include, for example, $C_{1-22}$ alkyl or $C_{7-25}$ alkylaryl sulfonates, $C_{1-22}$ alkyl or $C_{7-25}$ alkylaryl sulfates, $C_{1-22}$ alkyl or $C_{7-25}$ alkylaryl phosphates, substituted silicates, and mixtures thereof. A specific surfactant is a $C_{6-16}$, specifically a $C_{8-12}$ alkyl sulfonate. This emulsion polymerization process is described and disclosed in various patents and literature of such companies as Rohm & Haas and General Electric Company (now SABIC Innovative Plastics). In the practice, any of the above-described impact modifiers may be used providing it is free of the alkali metal salts of fatty acids, alkali metal carbonates and other basic materials.

A specific impact modifier of this type is a methyl methacrylate-butadiene-styrene (MBS) impact modifier wherein the butadiene substrate is prepared using above-described sulfonates, sulfates, or phosphates as surfactants. Other exemplary elastomer-modified graft copolymers include acrylonitrile-butadiene-styrene (ABS), acrylonitrile-styrene-butyl acrylate (ASA), methyl methacrylate-acrylonitrile-butadiene-styrene (MABS), and acrylonitrile-ethylene-propylene-diene-styrene (AES).

In some embodiments, the impact modifier is a graft polymer having a high rubber content, i.e., greater than or equal to about 50 wt %, optionally greater than or equal to about 60 wt % by weight of the graft polymer. The rubber is desirably present in an amount less than or equal to about 95 wt %, optionally less than or equal to about 90 wt % of the graft polymer.

In specific embodiments, the impact modifier (B) is selected from the group consisting of ABS, MBS, and combinations thereof. Suitable ABS resins are available from SABIC Innovative Plastics as BLENDEX® grades 131, 336, 338, 360, and 415.

If desired, the thermoplastic composition may further comprise a talc filler (C). Generally, the talc can be of any shape, including fibrous, modular, needle shaped, or lamellar. If desired, the talc may be coated with a layer of metallic material to facilitate conductivity, or surface treated with silanes to improve adhesion and dispersion with the polymeric matrix resin. The talc may also be treated with an acid or an acid salt, such as phosphorous acid or phosphoric acid. In such embodiments, the weight ratio of acid to talc, or acid:talc weight ratio, may be from about 0.02 to about 0.04.

In embodiments, the thermoplastic composition comprises from about 45 to about 98 wt % polycarbonate polymer (A); and about 2 to about 40 wt % impact modifier (B). If talc filler (C) is present, it may comprise from 0 to about 25 wt % of the composition. In other embodiments, the talc filler comprises from about 5 to about 20 wt % of the composition.

In additional embodiments, the thermoplastic composition further comprises a styrene-acrylonitrile (SAN), polymer (D) in an amount of from about 5 to about 10 weight percent of the thermoplastic composition. The SAN polymer may function to compatibilize the polymer components (A) and (B) and to enhance the flow of the thermoplastic composition. It should be noted that ABS polymers and other rubber-based polymers, which may be used as the impact modifier (B), may contain "free" styrene-acrylonitrile polymer as a result of incomplete polymerization with the butadiene during the manufacture of ABS. The "free" SAN content may range from single digits to greater than 50% of the ABS polymer. This "free" SAN in the ABS polymer or rubber-based polymer is considered an impurity or byproduct, and should not be considered as the SAN polymer (D).

The resulting thermoplastic compositions have a combination of desired properties, including improved heat resistance and chemical resistance, and maintains good mechanical properties. The thermoplastic composition may have a percent retention of tensile elongation of at least 50 percent upon exposure to Fuel C, 0.5% strain, for 2 days according to ISO 4599; a glass transition temperature of from about 160° C. to about 195° C. measured according to ISO 11357; a heat deflection temperature of at least 130° C., when measured according to ISO 75; a Vicat B50 softening temperature of at least 150° C., when measured according to ISO 306; a tensile modulus of at least 3500 MPa according to ISO 527; or a melt volume rate (MVR) of 15 cc/10 min or less, when measured according to ISO 1133 at 260° C., 5 kg. In other embodiments, the thermoplastic composition meets two or three of these requirements and in some embodiments, all four of these requirements. In embodiments which do not contain the talc filler, the MVR may be from about 4 to about 10 cc/10 min, when measured according to ISO 1133 at 260° C., 5 kg. In embodiments which do contain the talc filler, the MVR may more specifically be from about 7 to 15 cc/10 min, when measured according to ISO 1133 at 260° C., 5 kg. In some more specific embodiments, the thermoplastic composition has a percent retention of tensile elongation of at least 80 percent upon exposure to Fuel C, 0.5% strain, for 2 days according to ISO 4599

For heat deflection temperature and Vicat softening temperature, a higher value indicates better heat resistance. For chemical resistance, a higher value indicates better chemical resistance.

The thermoplastic composition may also include various additives, with the proviso that the additives do not adversely affect the desired properties of the thermoplastic compositions. Mixtures of additives may be used. Such additives may be mixed at a suitable time during the mixing of the components for forming the composition.

Further non-limiting examples of additives that may be included in the composition include optical effects filler, antioxidant, heat stabilizer, light stabilizer, ultraviolet light absorber, plasticizer, mold release agent, lubricant, antistatic agent, flame retardant, anti-drip agent, gamma stabilizer, or a combination comprising at least one of the foregoing additives. Each of these additives can be present in amounts of from about 0.0001 to about 10 weight percent, based on the total weight of the thermoplastic composition.

The thermoplastic compositions may be manufactured by methods generally available in the art. For example, in one embodiment, in one manner of proceeding, the polymer components (A) and (B) and any other optional components (such as antioxidants, mold release agents, and the like) are first blended, in a Henschel™ high speed mixer or other suitable mixer/blender. Other low shear processes including but not limited to hand mixing may also accomplish this blending. The blend is then fed into the throat of a twin-screw extruder via a hopper. Alternatively, one or more of the components may be incorporated into the composition by feeding directly into the extruder at the throat and/or downstream through a sidestuffer. Such additives may also be compounded into a masterbatch with a desired polymeric resin and fed into the extruder. The extruder is generally operated at a temperature higher than that necessary to cause the composition to flow. The extrudate is immediately quenched in a water batch and pelletized. The pellets, so prepared, when cutting the extrudate may be one-fourth inch long or less as desired. Such pellets may be used for subsequent molding, shaping, or forming.

The increased heat resistance of the thermoplastic compositions allows the compositions to be used in high heat products and industrial applications such as painting and in high temperature environments.

Shaped, formed, or molded articles comprising the polycarbonate compositions are also provided. The polycarbonate compositions may be molded into useful shaped articles by a variety of means such as injection molding, extrusion, rotational molding, blow molding and thermoforming to form articles such as, for example, computer and business machine housings such as housings for monitors, handheld electronic device housings such as housings for cell phones, electrical connectors, and components of lighting fixtures, ornaments, home appliances, roofs, greenhouses, sun rooms, swimming pool enclosures, electronic device casings and signs and the like. In addition, the polycarbonate compositions may be used for such applications as automotive panel and trim. Examples of suitable articles are exemplified by but are not limited to aircraft, automotive, truck, military vehicle (including automotive, aircraft, and water-borne vehicles), scooter, and motorcycle exterior and interior components, including panels, quarter panels, rocker panels, trim, fenders, doors, deck-lids, trunk lids, hoods, bonnets, roofs, bumpers, fascia, grilles, mirror housings, pillar appliqués, cladding, body side moldings, wheel covers, hubcaps, door handles, spoilers, window frames, headlamp bezels, headlamps, tail lamps, tail lamp housings, tail lamp-bezels, license plate enclosures, roof racks, and running boards; enclosures, housings, panels, and parts for outdoor vehicles and devices; enclosures for electrical and telecommunication devices; outdoor furniture; aircraft components; boats and marine equipment, including trim, enclosures, and housings; outboard motor housings; depth finder housings; personal water-craft; jet-skis; pools; spas; hot tubs; steps; step coverings; building and construction applications such as glazing, roofs, windows, floors, decorative window furnishings or treatments; treated glass covers for pictures, paintings, posters, and like display items; wall panels, and doors; counter tops; protected graphics; outdoor and indoor signs; enclosures, housings, panels, and parts for automatic teller machines (ATM); computer; desk-top computer; portable computer; lap-top computer; hand held computer housings; monitor; printer; keyboards; FAX machine; copier; telephone; phone bezels; mobile phone; radio sender; radio receiver; enclosures, housings, panels; and parts for lawn and garden tractors, lawn mowers, and tools, including lawn and garden tools; window and door trim; sports equipment and toys; enclosures, housings, panels, and parts for snowmobiles; recreational vehicle panels and components; playground equipment; shoe laces; articles made from plastic-wood combinations; golf course markers; utility pit covers; light fixtures; lighting appliances; network interface device housings; transformer housings; air conditioner housings; cladding or seating for public transportation; cladding or seating for trains, subways, or buses; meter housings; antenna housings; cladding for satellite dishes; coated helmets and personal protective equipment; coated synthetic or natural textiles; coated painted articles; coated dyed articles; coated fluorescent articles; coated foam articles; and like applications. The invention further contemplates additional fabrication operations on said articles, such as, but not limited to, molding, in mold decoration, baking in a paint oven, lamination, and/or thermoforming. The articles made from the composition of the present invention may be used widely in automotive industry, home appliances, electrical components, and telecommunications.

The following examples are provided to illustrate the polycarbonate compositions, articles, and methods of the present disclosure. The examples are merely illustrative and are not intended to limit the disclosure to the materials, conditions, or process parameters set forth therein.

EXAMPLES

Mechanical properties were measured according to the following ISO standards, as indicated:

|  | Standards | Testing Conditions |
|---|---|---|
| Tensile Modulus | ISO 527 | 1 mm/min |
| Yield Stress | ISO 527 | 5 or 50 mm/min |
| Strain @ Break | ISO 527 | 5 or 50 mm/min |
| Flexural Modulus | ISO 178 |  |
| Heat Deflection Temperature (HDT) | ISO 75 | 1.8 MPa, flat |
| Vicat B50 | ISO 306 | 50 N, 50° C./hr |
| Melt Velocity Rate | ISO 1133 | 260 or 300° C., 5 kg |
| Notched Izod Impact Strength | ISO 180 | notched, 23° C. |

Chemical Resistance is a measure of the percent retention of Tensile Elongation. Chemical Resistance was evaluated per ISO 4599 using injection molded tensile bars (4 mm thick molded tensile bars tested per ISO 527) made from the example compositions. The tensile bars were clamped to a semicircular jig to impart a constant applied strain of 0.5%. The strained bars were then exposed to a specific chemical for a specific amount of time, depending on the chemical and desired test. After the exposure, the tensile bars were tested under tensile loading according to ISO 527 (tensile elongation at break was determined using 4 mm thick molded tensile bars tested per ISO 527 at a pull rate of 1 mm/min. until 1% strain, followed by a rate of 50 mm/min. until the sample broke). The tensile elongation to break of the exposed bars was compared to the tensile elongation to break of the unexposed bars. The retention of elongation was thus determined; higher values indicated better chemical resistance.

The Examples discussed therein used the following ingredients in their compositions:

| Ingredient | Description | Supplier |
|---|---|---|
| MBS | nominal 75-82 wt. % butadiene core with a balance styrene-methyl methacrylate shell. (Trade name EXL-2691A) | Rohm & Haas |
| Bulk ABS | Bulk Acrylonitrile Butadiene Styrene with nominal 16% butadiene and content and nominal 15% acrylonitrile content, phase inverted with occluded SAN in a butadiene phase in SAN matrix | SABIC Innovative Plastics |
| PC-4 | High flow BPA polycarbonate polymer resin made by the melt process with a Mw of about 21,700 Daltons versus polycarbonate standards | SABIC Innovative Plastic |
| PC-3 | Low flow BPA polycarbonate polymer resin made by the melt process with a Mw of about 29,600 Daltons versus polycarbonate standards | SABIC Innovative Plastic |

| Ingredient | Description | Supplier |
|---|---|---|
| PC-1 | low flow BPA polycarbonate polymer resin made by the interfacial process with a Mw of about 29,900 Daltons versus polycarbonate standards | SABIC Innovative Plastic |
| PC-2 | Low flow BPA polycarbonate polymer resin made by the melt process with a Mw of about 29,600 Daltons versus polycarbonate standards | SABIC Innovative Plastic |
| SAN-2 | SAN copolymer with an acrylonitrile content of about 15-35%, MFR (220° C./1.2 kg) of 18 to 24 g/10 min | SABIC Innovative Plastic |
| Fine Talc | LUZENAC fine talc (magnesium silicate hydrate), LUZENAC grade Jetfine 3CA | Luzenac Europe |
| $H_3PO_3$ | $H_3PO_3$, 45% in water | Quaron |
| Co-PC-1 | terpolymer of hydroquinone, methylhydroquinone, and bisphenol A in mole ratio of HQ/MeHQ/BPA of 34/33/33 having a Tg of 120-125° C. and a molecular weight of 56,000 | SABIC Innovative Plastic |
| Co-PC-2 | terpolymer of hydroquinone, methylhydroquinone, and bisphenol A in mole ratio of HQ/MeHQ/BPA of 34/33/33 having a Tg of 120-125° C. and a molecular weight of 45,000 | SABIC Innovative Plastic |
| SAN-1 | bulk polymerized SAN copolymer with an acrylonitrile content of about 23-27%, MFR (190° C./1.2 kg) of 5 to 8 g/10 min | SABIC Innovative Plastic |
| Co-PC-3 | terpolymer of hydroquinone, methylhydroquinone, and PPPBP in mole ratio of 40/40/20 having a Tg of 167° C. and a molecular weight of 19,000 to 20,000 (PC standards) | SABIC Innovative Plastic |
| Co-PC-4 | terpolymer of hydroquinone, methylhydroquinone, and PPPBP in mole ratio of 34/33/33 having a Tg of 192° C. and a molecular weight of 21,000 to 22,000 (PC standards) | SABIC Innovative Plastic |

Example 1

Six comparative compositions CE1-CE6 were made and tested. Three compositions used only polycarbonate homopolymers while three compositions included a HQ/MeHQ/BPA terpolymer. The ones using a terpolymer are marked "TP". Four of the compositions used filler; two of the compositions did not include a filler. The compositions and results are shown below in Table 1. The compositions are given in weight percent.

TABLE 1

| Item Description | Unit | CE1 | CE2-TP | CE3 | CE4-TP | CE5 | CE6-TP |
|---|---|---|---|---|---|---|---|
| PC-1 | % | 10 | 10 | | | 10 | 10 |
| PC-2 | % | | | 10 | 10 | | |
| PC-3 | % | 47.71 | | 43.36 | | 38.77 | |
| PC-4 | % | 19.3 | | 13.35 | | 20.39 | |
| SAN-1 | % | 9.5 | 9.5 | | | 5.93 | 5.93 |
| SAN-2 | % | | | 9.5 | 9.5 | | |
| Bulk ABS | % | | | | | 19.76 | 19.76 |
| MBS | % | 4.4 | 4.4 | 4.4 | 4.4 | 3.95 | 3.95 |
| Fine Talc | % | 8 | 8 | 18 | 18 | | |
| $H_3PO_3$, 45% in H2O | % | 0.24 | 0.24 | 0.54 | 0.54 | | |
| Others | % | 0.85 | 0.85 | 0.85 | 0.85 | 1.2 | 1.2 |
| Co-PC-1 | % | | 67.01 | | 56.71 | | 38.77 |
| Co-PC-2 | % | | | | | | 20.39 |
| Tensile Modulus | MPa | 3285 | 3309 | 4655 | 4782 | 2254 | 2215 |
| Yield stress (5 mm/min) | MPa | 60 | 57 | 63 | 61 | 50 | 49 |
| Strain @ break (5 mm/min) | % | 105 | 54 | 9 | 10 | 95 | 57 |
| Flexural Modulus | MPa | 3153 | 3134 | 4474 | 4493 | 2164 | 2103 |
| HDT | ° C. | 118 | 99 | 122 | 103 | 103 | 86 |
| Vicat | ° C. | 135 | 116 | 137 | 117 | 125 | 109 |
| MVR (260° C., 5 kg) | cc/10 min | 12.5 | 21.5 | 8.1 | 16.1 | | |
| Izod Impact | kJ/m² | 36 | 15 | 10 | 9 | 54 | 41 |
| Gasoline | 0.3% 5 min | 4 | 113 | 28 | 101 | | |
| | 0.3% 15 min | | | | | 9 | 19 |
| | 0.5% 15 min | | | | | 1 | 12 |
| | 0.5% 30 min | | | | | 1 | 9 |
| Diesel | 0.5% 48 hrs | 109 | 116 | 123 | 96 | | |
| | 1% 24 hrs | | | | | 9 | 19 |
| | 1% 48 hrs | | | | | 8 | 20 |
| Fuel C+ | 0.5% 2 min | 2 | 106 | 18 | 95 | 6 | 25 |

TABLE 1-continued

| Item Description | Unit | CE1 | CE2-TP | CE3 | CE4-TP | CE5 | CE6-TP |
|---|---|---|---|---|---|---|---|
| Ethanol | 1% 24 hrs | | | | | 96 | 113 |
| | 1% 48 hrs | | | | | 3 | 3 |
| Mr Proper | 1% 48 hrs | | | | | 3 | 5 |
| Sun Cream | 0.5% 48 hrs | | | | | 28 | 86 |
| Olive Oil | 1% 48 hrs | | | | | 0 | 34 |
| Lincoln Oil | 0.5% 17 hrs 70° C. | | | | | 11 | 21 |

The results showed that the terpolymer-containing blends had better chemical resistance compared to the blends containing only polycarbonate homopolymers (CE1, CE3 and CE5). However, the two terpolymer blends containing filler (CE2 and CE4) had improved tensile modulus compared to their counterparts (CE1 and CE3), whereas the non-filler terpolymer blend (CE6) did not. In addition, all three terpolymer-containing blends (CE2, CE4, and CE6) had comparatively lower heat deflection temperatures, lower Vicat temperatures, and higher MVRs.

Example 2

One additional comparative composition CE7 and three example compositions E1-E3 were made. The example compositions differed in that they used HQ/MeHQ/PPPBP terpolymers instead of HQ/MeHQ/BPA terpolymers. The compositions and results are shown below in Table 2. In addition, Table 2 contains CE2, CE4, and CE6 for comparative purposes.

and Vicat temperatures were lower for CE2, CE4, and CE5 compared to CE7, E1-E3 have higher HDT and Vicat temperatures. The decrease in MVR of Examples E1-E3 compared to CE7, CE2, and CE3 is also noted.

Example 3

Four example compositions E4-E7 and five comparative compositions CE8-CE12 were made. The four example compositions all included HQ/MeHQ/PPPBP polymers that varied in the amounts and ratios of the three monomers. One comparative composition was a BPA-PPPBP copolymer and one comparative composition was a BPA/HQ/MeHQ terpolymer. The other three comparative compositions were Ultem® 1000, an amorphous thermoplastic polyetherimide (PEI) resin; PC-3; and Radel® R-5800 polyphenylsulfone resin (a transparent, high flow resin for injection molding) Chemical resistance was tested as described above. The compositions

TABLE 2

| Item Description | Unit | CE7 | CE2 | CE4 | CE6 | E1 | E2 | E3 |
|---|---|---|---|---|---|---|---|---|
| PC-1 | % | | 10 | | 10 | | | |
| PC-2 | % | | | 10 | | | | |
| PC-3 | % | 53.91 | | | | | | |
| PC-4 | % | 23.1 | | | | | | |
| SAN-1 | % | | 9.5 | | 5.93 | | | |
| SAN-2 | % | 9.5 | | 9.5 | | 9.5 | 9.5 | 9.5 |
| Bulk ABS | % | | | | 19.76 | | | |
| MBS | % | 4.4 | 4.4 | 4.4 | 3.95 | 4.4 | 4.4 | 4.4 |
| Fine Talc | % | 8 | 8 | 18 | | 8 | 8 | 8 |
| H3PO3, 45% in H2O | % | 0.24 | 0.24 | 0.54 | | 0.24 | 0.24 | 0.24 |
| Others | % | .85 | .85 | .85 | 1.2 | .85 | .85 | .85 |
| Co-PC-1 | % | | 67.01 | 56.71 | 38.77 | | | |
| Co-PC-2 | % | | | | 20.39 | | | |
| Co-PC-3 | % | | | | | 77.01 | 38.5 | |
| Co-PC-4 | % | | | | | | 38.51 | 77.01 |
| Tensile Modulus | MPa | 3217 | 3309 | 4782 | 2215 | 3548 | 3641 | 3682 |
| Yield stress (50 mm/min) | MPa | 60.6 | 57 | 61 | 49 | 76.1 | 79.2 | 81.7 |
| Strain @ break (50 mm/min) | % | 94 | 54 | 10 | 57 | 22 | 15 | 11 |
| Flexural Modulus | MPa | 3159 | 3134 | 4493 | 2103 | 3556 | 3596 | 3644 |
| HDT | ° C. | 121 | 99 | 103 | 86 | 134 | 146 | 157 |
| Vicat | ° C. | 135 | 116 | 117 | 109 | 155 | 165 | 170 |
| MVR | cc/10 min | 50 | 21.5 | 16.1 | | 14.2 | 10.5 | 7.2 |
| Izod Impact | kJ/m$^2$ | 30 | 15 | 9 | 41 | 11.3 | 9.8 | 8.1 |
| Gasoline | 0.5% 15 min | 15 | | | 12 | 84 | 91 | 99 |
| Fuel C+ | 0.5% 2 min | 3 | 106 | 95 | 25 | 81 | 87 | 96 |

The results showed that generally, E1-E3 had a higher tensile modulus compared to CE2, which had an identical amount of filler. Examples E1-E3 also maintained the improved chemical resistance. In addition, whereas the HDT and results are shown below in Table 3. The chemical resistance results are shown as percent retention of tensile elongation. Generally, the higher the percent retention, the better, and a percent retention of 80% or higher was desired.

TABLE 3

| Item Description | Unit | CE8 Ultem 1000 | CE9 Radel 5800 | CE10 PC-3 | CE11 | CE12 | E4 | E5 | E6 | E7 |
|---|---|---|---|---|---|---|---|---|---|---|
| HQ | mole % | | | | | 34 | 40 | 40 | 40 | 34 |
| MeHQ | mole % | | | | | 33 | 26 | 40 | 30 | 33 |
| PPPBP | mole % | | | | 45 | | 17 | 20 | 30 | 33 |
| BPA | mole % | | | | 55 | 33 | 17 | | | |
| Mw | | 28648 | | 28152 | 24285 | 26871 | 19727 | 19520 | 21144 | 21386 |
| Tg | ° C. | 217 | | 152 | 210 | 125 | 162 | 167 | 191 | 192 |
| MVR (300° C., 1.2 kg, 240 sec) | cc/10 min | | | | | | 9.78 | 4.26 | | 8.84 |
| MVR (330° C., 2.16 kg, 240 sec) | g/10 min | | 3.43 | | 11.685 | | | | 17.215 | 12.605 |
| 1.5% strain, 7 days | % | | | | 10.00 | | | | 85.57 | 14.23 |
| 1% strain, 3 days | % | | | | 82.38 | | 43.91 | | 109.99 | 87.59 |
| Windex, 0.5% strain, 1 day | % | | | 76.89 | 56.57 | 101.95 | 51.11 | 102.75 | 76.29 | 49.55 |
| Windex, 0.5% strain, 12 days | % | 88.55 | 93.14 | 85.18 | 76.19 | 88.32 | 74.40 | 97.89 | 72.14 | 0.00 |
| Fuel C, 0.5% strain, 1 day | % | | | | 19.52 | 91.92 | 42.51 | 90.21 | 87.50 | 47.27 |
| Fuel C, 0.5% strain, 2 day | % | 49.46 | 98.58 | | | 54.28 | 53.14 | 99.47 | 99.30 | 88.64 |
| Detergent, 80° C., 0.5% strain, 1 day | % | 142.39 | 95.2 | 56.39 | 15.24 | 83.50 | 40.14 | 70.77 | 9.23 | 5.55 |
| Intralipid, 1% strain, 3 days | % | | 47.31 | | 79.70 | 66.05 | | 66.79 | 93.52 | 99.77 | 85.00 |
| Intralipid, 1.5% strain, 7 days | % | 62.09 | 77.48 | 2.50 | | 80.09 | | 85.92 | | |

Comparing E4, E5, E6, and E7, as PPPBP content increased the Tg increased as well, but increased PPPBP content also appeared to negatively affect the chemical resistance to Windex, detergent, and intralipids. E5 had the best balance of high Tg and good chemical resistance. Interestingly, the chemical resistance to Fuel C did not correlate with the PPPBP content. Surprisingly, chemical resistance to Fuel C was maximized in E5.

The thermoplastic compositions of the present disclosure have been described with reference to exemplary embodiments. Obviously, modifications and alterations will occur to others upon reading and understanding the preceding detailed description. It is intended that the exemplary embodiments be construed as including all such modifications and alterations insofar as they come within the scope of the appended claims or the equivalents thereof.

The invention claimed is:

1. A thermoplastic composition comprising:
a polycarbonate terpolymer (A) having repeating units derived from three different monomers (I), (II), and (III), wherein
monomer (I) is 2-phenyl-3,3-bis(4-hydroxyphenyl)phthalimidine (PPPBP); and
monomers (II) and (III) are each a dihydroxy compound of formula (I):

Formula (I)

wherein each $R^k$ is independently a halogen atom, a $C_{1-10}$ hydrocarbon group, or a $C_{1-10}$ halogen substituted hydrocarbon group, and n is 0 to 4, monomer (II) being different from monomer (III); and
an impact modifier (B) selected from the group consisting of acrylonitrile-butadiene-styrene (ABS) and methacrylonitrile-butadiene-styrene (MBS) resins, and mixtures thereof;
wherein the thermoplastic composition has a percent retention of tensile elongation of at least 80 percent upon exposure to Fuel C, 0.5% strain, for 2 days according to ISO 4599;
wherein the polycarbonate polymer (A) has a glass transition temperature of 165° C. or greater; and
wherein the ratio of monomer (II) to monomer (III) is from about 3:4 to about 4:3 and the polycarbonate terpolymer contains about 80 mole percent of monomers (II) and (III) combined.

2. The thermoplastic composition of claim 1, wherein monomer (II) is methylhydroquinone and monomer (III) is hydroquinone.

3. The thermoplastic composition of claim 1, wherein monomer (II) is methylhydroquinone; and the polycarbonate polymer comprises at least 17 mole percent of monomer (I) and at least 25 mole percent of monomer (II).

4. The thermoplastic composition of claim 1, wherein the polycarbonate polymer (A) comprises from about 60 to about 80 weight percent of the composition; and the impact modifier (B) comprises from about 2 to about 40 weight percent of the composition.

5. The thermoplastic composition of claim 1, further comprising a talc filler (C) that comprises from about 5 to about 20 weight percent of the composition.

6. The thermoplastic composition of claim 1, wherein the thermoplastic composition does not comprise a talc filler and has a melt volume rate (MVR) of from about 4 to about 10 cc/10 min, when measured according to ISO 1133 at 260° C., 5 kg.

7. The thermoplastic composition of claim 1, wherein the thermoplastic composition has a melt volume rate (MVR) of 15 cc/10 min or less, when measured according to ISO 1133 at 260° C., 5 kg.

8. The thermoplastic composition of claim 1, wherein the thermoplastic composition has a heat deflection temperature of at least 130° C., when measured according to ISO 75.

9. The thermoplastic composition of claim 1, wherein the thermoplastic composition has a Vicat B50 softening temperature of at least 150° C., when measured according to ISO 306.

10. The thermoplastic composition of claim 1, further comprising a styrene-acrylonitrile polymer (D) in an amount of from about 5 to about 10 weight percent of the thermoplastic composition.

11. An article formed from the thermoplastic composition of claim 1.

12. A thermoplastic composition comprising:
a polycarbonate terpolymer (A) having repeating units derived from three different monomers, the three monomers being 2-phenyl-3,3-bis(4-hydroxyphenyl)phthalimidine (PPPBP), hydroquinone and methylhydroquinone; and
an impact modifier (B);
wherein the thermoplastic composition has a heat deflection temperature of at least 130° C., when measured according to ISO 75;
wherein the polycarbonate polymer (A) has a glass transition temperature of 165° C. or greater; and
wherein the ratio of methylhydroquinone to hydroquinone is from about 3:4 to about 4:3 and the polycarbonate terpolymer contains about 80 mole percent of hydroquinone and methylhydroquinone combined.

13. A polycarbonate terpolymer having repeating units derived from three different monomers (I), (II), and (III), wherein
monomer (I) is 2-phenyl-3,3-bis(4-hydroxyphenyl)phthalimidine (PPPBP); and
monomers (II) and (III) are each a dihydroxy compound of formula (I):

Formula (I)

wherein each $R^k$ is independently a halogen atom, a $C_{1-10}$ hydrocarbon group, or a $C_{1-10}$ halogen substituted hydrocarbon group, and n is 0 to 4, monomer (II) being different from monomer (III);
wherein the polymer has a percent retention of tensile elongation of at least 80 percent upon exposure to Fuel C, 0.5% strain, for 2 days according to ISO 4599;
wherein the polycarbonate polymer (A) has a glass transition temperature of 165° C. or greater; and
wherein the ratio of monomer (II) to monomer (III) is from about 3:4 to about 4:3 and the polycarbonate terpolymer contains about 80 mole percent of monomers (II) and (III) combined.

14. The polycarbonate polymer of claim 13, wherein:
monomer (II) is methylhydroquinone;
monomer (III) is hydroquinone;
monomer (I) comprises at least 17 mole percent of the polycarbonate polymer; and
monomer (II) comprises at least 25 mole percent of the polycarbonate polymer.

* * * * *